United States Patent
Amano et al.

(10) Patent No.: US 8,757,304 B2
(45) Date of Patent: Jun. 24, 2014

(54) ELECTRIC VEHICLE

(71) Applicant: Honda Motor Co., Ltd., Tokyo (JP)

(72) Inventors: Atsushi Amano, Utsunomiya (JP);
Ryuta Wakabayashi, Utsunomiya (JP);
Tomoyuki Suzuki, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/993,584

(22) PCT Filed: Oct. 9, 2012

(86) PCT No.: PCT/JP2012/076090
§ 371 (c)(1),
(2), (4) Date: Jun. 12, 2013

(87) PCT Pub. No.: WO2013/073318
PCT Pub. Date: May 23, 2013

(65) Prior Publication Data
US 2014/0090908 A1     Apr. 3, 2014

(30) Foreign Application Priority Data

Nov. 14, 2011    (JP) ................................. 2011-248166

(51) Int. Cl.
*B60R 16/04*     (2006.01)
*B60K 11/00*     (2006.01)
*B60K 1/04*      (2006.01)
*B60K 1/00*      (2006.01)

(52) U.S. Cl.
USPC ..... 180/65.1; 180/65.21; 180/68.1; 180/68.2; 180/68.5

(58) Field of Classification Search
CPC .......... B60R 16/04; B60K 11/00; B60K 1/04; B60K 1/11
USPC .................. 180/65.1, 65.21, 68.5, 68.1, 68.2
See application file for complete search history.

(56) References Cited

U.S. PATENT DOCUMENTS

| | | | |
|---|---|---|---|
| 2012/0031695 A1* | 2/2012 | Tsuchiya et al. | 180/68.5 |
| 2012/0312609 A1* | 12/2012 | Takewaka et al. | 180/65.1 |
| 2013/0134775 A1* | 5/2013 | Tomokage et al. | 307/9.1 |

FOREIGN PATENT DOCUMENTS

| | | |
|---|---|---|
| CN | 101263629 A | 9/2008 |
| JP | 6-303704 A | 10/1994 |

(Continued)

OTHER PUBLICATIONS

International Search Report issued in PCT/JP2012/076090, mailed Jan. 15, 2013, 6 pages.

(Continued)

*Primary Examiner* — Hau Phan
*Assistant Examiner* — Bryan Evans
(74) *Attorney, Agent, or Firm* — Arent Fox LLP (57) ABSTRACT

An electric vehicle includes a plurality of electric devices; and a power control unit having a housing, the power control unit is arranged within a motor room, the housing has an upper case, a lower case, and a heat sink housing, the heat sink housing has a heat sink portion, the electric devices are each arranged at the upper and lower sides of the heat sink housing, the electric devices are covered with the upper case and the lower case, the lower case is formed with a recess, and cables that connect an electric device arranged outside the housing and the electric device covered with the upper case enter inside of the upper case through the recess from the undersurface of the heat sink housing, and the cables are connected to the electric device covered with the upper case.

3 Claims, 7 Drawing Sheets

(56) References Cited

FOREIGN PATENT DOCUMENTS

| | | |
|---|---|---|
| JP | 2000-060149 A | 2/2000 |
| JP | 2000-142177 A | 5/2000 |
| JP | 2003-101277 A | 4/2003 |
| JP | 2004-181979 A | 7/2004 |
| JP | 2005-166866 A | 6/2005 |
| JP | 2006-280037 A | 10/2006 |
| JP | 2007-290616 A | 11/2007 |
| WO | WO 2012/105353 A1 | 8/2012 |
| WO | WO 2012/157316 A1 | 11/2012 |

OTHER PUBLICATIONS

Chinese Office Action issued in Application No. 201280004065.2, dated Dec. 19, 2013, 7 pages.

* cited by examiner

ELECTRIC VEHICLE

CROSS-REFERENCE TO RELATED APPLICATIONS

This application is a National Stage entry of International Application No. PCT/JP2012/076090, filed Oct. 9, 2012, which claims priority to Japanese Application No. 2011-248166, filed Nov. 14, 2011. The disclosures of the prior applications are hereby incorporated in their entirety by reference.

TECHNICAL FIELD OF THE INVENTION

The present invention relates to an electric vehicle. Priority is claimed on Japanese Patent Application No. 2011-248166, filed Nov. 14, 2011, the content of which is incorporated herein by reference.

BACKGROUND ART

An electric vehicle in which electric devices are collectively stored in a housing, and a power control unit for an electric vehicle adapted to lower cost by virtue of a reduction in the number of cables and to improve space efficiency is arranged within a motor room of a vehicle front part is known (for example, refer to Patent Document 1).

PRIOR ART DOCUMENTS

Patent Documents

Patent Document 1: Japanese Unexamined Patent Application, First Publication No. 2004-181979

SUMMARY OF THE INVENTION

Problems to be Solved by the Invention

While the housing of the power control unit as described above becomes comparatively large in order to store many electric devices, it is preferable to arrange the power control unit within a motor room where a motor is stored as described above if connection with devices, such as a motor, is taken into consideration.

However, if the power control unit is arranged within the motor room as described above, the clearance between the housing of the power control unit and surrounding devices, structural members, or the like tends to become narrow, and the above housing and the structural members or the like tends to interfere with each other at the time of collision. In this case, there is a possibility that cables (high-voltage cables or the like) which are connected to the housing and exposed to the outside of the housing may be easily pinched between the housing and the above structural members or the like and interfere with each other. For this reason, there is a need to consider an arrangement of cables that inhibits the influence at the time of collision.

Thus, an object of the invention is to provide an electric vehicle that can inhibit cables, which are to be connected to a housing of a power control unit in a case where the power control unit is arranged within a motor room, from interfering with members around the power control unit at the time of a collision, and can protect the cables effectively.

Means for Solving the Problems

As means for solving the above subject, the invention has adopted the following.

(1) An electric vehicle related to an aspect of the invention includes a plurality of electric devices; and a power control unit having a housing that stores the electricity devices, wherein, the power control unit is arranged within a motor room, the housing includes an upper case that is arranged at a relatively upper side, a lower case that is arranged at a relatively lower side, and a heat sink housing that is fixed between the upper case and the lower case and constitutes a portion of an outer wall of the housing at a substantially intermediate position of the housing in an up-and-down direction, the heat sink housing has a heat sink portion for cooling the electric devices, the electric devices are arranged at the upper and lower sides of the heat sink housing, each of the electric devices are covered with the upper case and the lower case, the lower case is formed with a recess that is dented toward inner side of the housing and exposes undersurface of the heat sink housing downward, and cables that connect an electric device arranged outside the housing and the electric device covered with the upper case enter inside of the upper case through the recess from the undersurface of the heat sink housing, and the cables are connected to the electric device covered with the upper case.

(2) In the electric vehicle related to (1), a configuration may be adopted in which a battery is arranged under a floor of a vehicle body, the motor room is formed at a front part of the vehicle body, the recess is formed on a rear side in a front-and-rear direction of the vehicle body, and the cables extend from the battery, are wired along a shape of a dash panel that is arranged behind the motor room to partition a vehicle interior and the motor room, and enter inside of the upper case.

(3) In the electric vehicle related to (2), a configuration may be adopted in which the electric device covered with the upper case is supplied with electric power through the cables, and the electric power branches from the electric device so as to he distributed to the electric device covered with the lower case.

Effect of the Invention

According to the electric vehicle related to the aspect of the above (1) of the invention, in a case where the power control unit has moved due to collision or the like, the housing of the power control unit is brought into contact with its surrounding member before the cables come into contact with the surrounding member. Thereby, it is possible to inhibit the cables from interfering with the surrounding member, and the cables can be effectively protected.

According to the electric vehicle related to the above (2) of the invention, the cables from the battery to the power control unit can be shortened.

According to the electric vehicle related to the above (3) of the invention, the number of cables related to power supply can be reduced.

DESCRIPTION OF EMBODIMENTS

An embodiment of the invention will be described below. In addition, in the drawings to be used below, arrow FR indicates the front of a vehicle, arrow UP indicates the upside of the vehicle, and arrow LH indicates the left of the vehicle.

Figure 1:
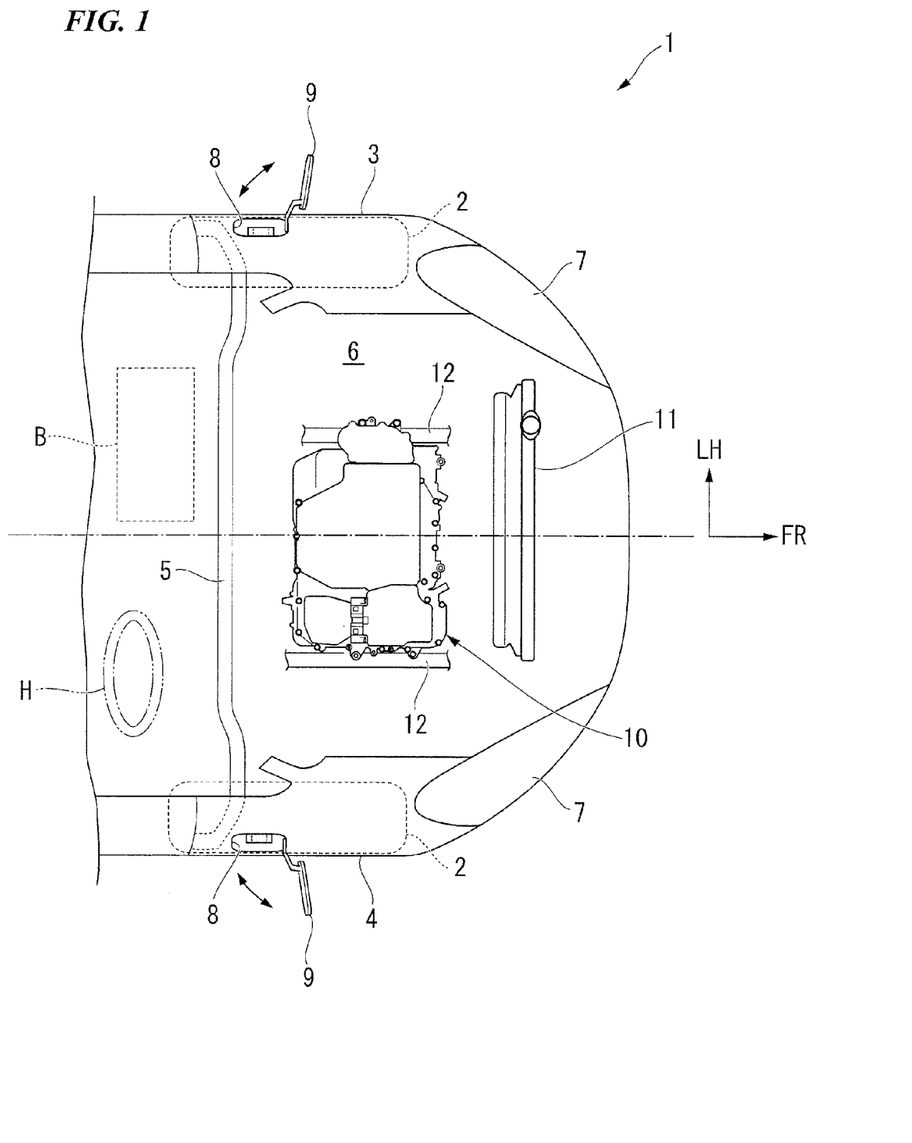
FIG. 1 is a top view of a vehicle front part of an electric vehicle on which a power control unit related to an embodiment of the invention is mounted.

A vehicle front part of an electric vehicle 1 related to the embodiment of the invention is shown in FIG. 1. The vehicle front part of the electric vehicle 1 is provided with a left front fender 3 and a right front fender 4 that cover left and right front wheels 2 and 2. The left front fender 3 and the right front fender 4 are joined to a dash panel 5 that extends in the vehicle width direction at both rear portions thereof. A motor room 6 that houses a motor for driving (not shown) is formed at the vehicle front part by the left front fender 3, the right front fender 4, and the dash panel 5.

The motor room 6 is partitioned from a rear vehicle interior by the dash panel 5. In addition, reference numeral 7 in FIG. 1 designates headlights 7 and 7 that are joined to front end portions of the left front fender 3 and the right front fender 4. A bumper (not shown) is provided between the headlights 7 and 7. Additionally, both of the left front fender 3 and the right front fender 4 are formed with charging ports 8 and 8, and both of the left and right charging ports 8 and 8 are openably and closably covered with lids 9 and 9. Additionally, reference numeral B in FIG. 1 designates a battery arranged under the floor of the vehicle interior of the electric vehicle 1. In the electric vehicle 1, the battery B can be charged with electric power from the charging ports 8 and 8. In addition, although only one unit of the battery B is shown in FIG. 1, in this electric vehicle 1, a plurality of batteries are arranged under the floor.

A power control unit (hereinafter, PCU) 10 that mainly controls a motor is arranged almost at the center within the motor room 6 in the vehicle width direction. Electric power is supplied to the PCU 10 from the battery B. The PCU 10 has a substantially rectangular shape in a top view. A radiator 11 is arranged ahead of the PCU 10 in the vehicle front-and-rear direction. The radiator 11 performs cooling by heat-exchanging a coolant of a drive train including the motor and the PCU 10 and a coolant of the battery that is not shown, with the outside air that is a traveling wind.

Additionally, reference numeral 12 in the drawing designates a unit support frame that supports the PCU 10. The PCU 10 is arranged so that the longitudinal direction thereof runs along the vehicle width direction, and is supported by the unit support frame 12 so that left and right side portions thereof are placed on the unit support frame 12. In addition, the electric vehicle 1 is a vehicle of right-hand drive specification, and reference numeral H in the drawing designates a steering wheel provided in the vehicle interior.

Figure 2:
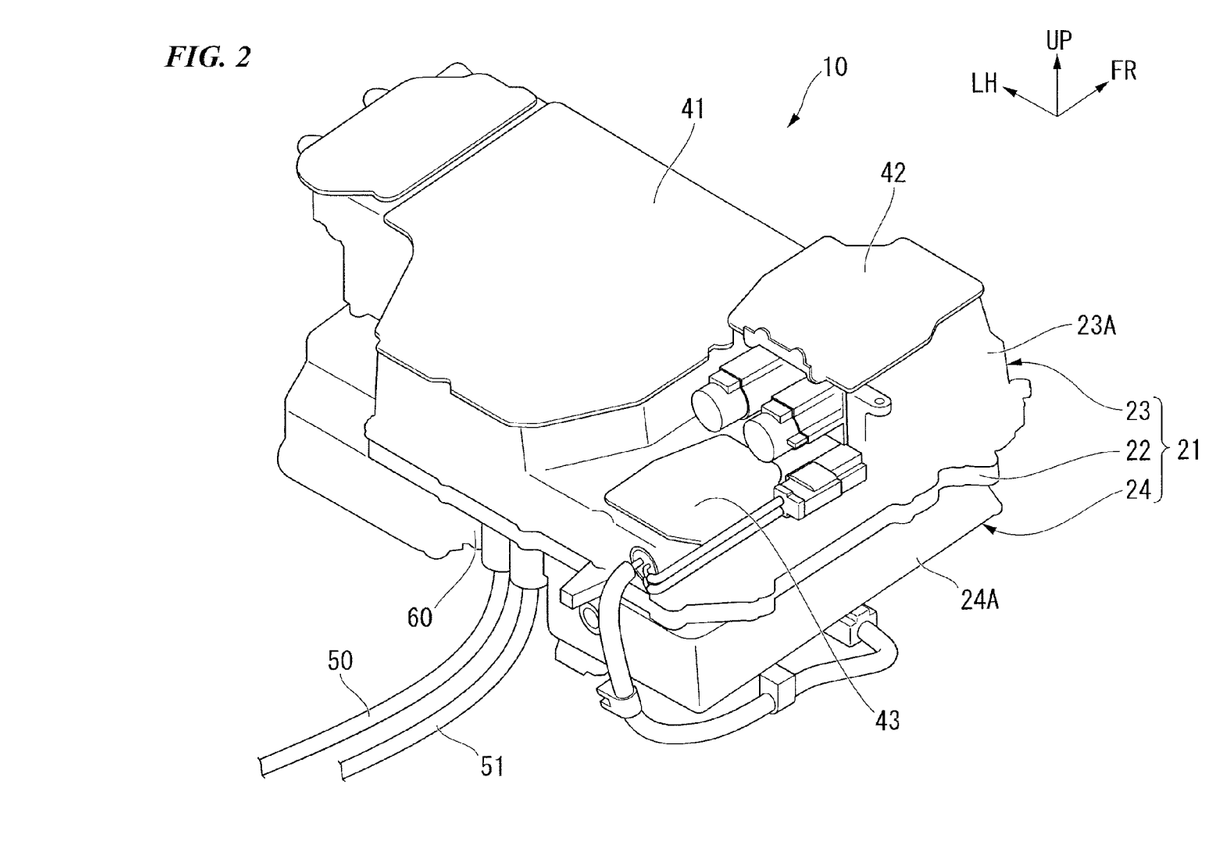
FIG. 2 is a perspective view of the power control unit as seen from the right rear side.
Figure 3:
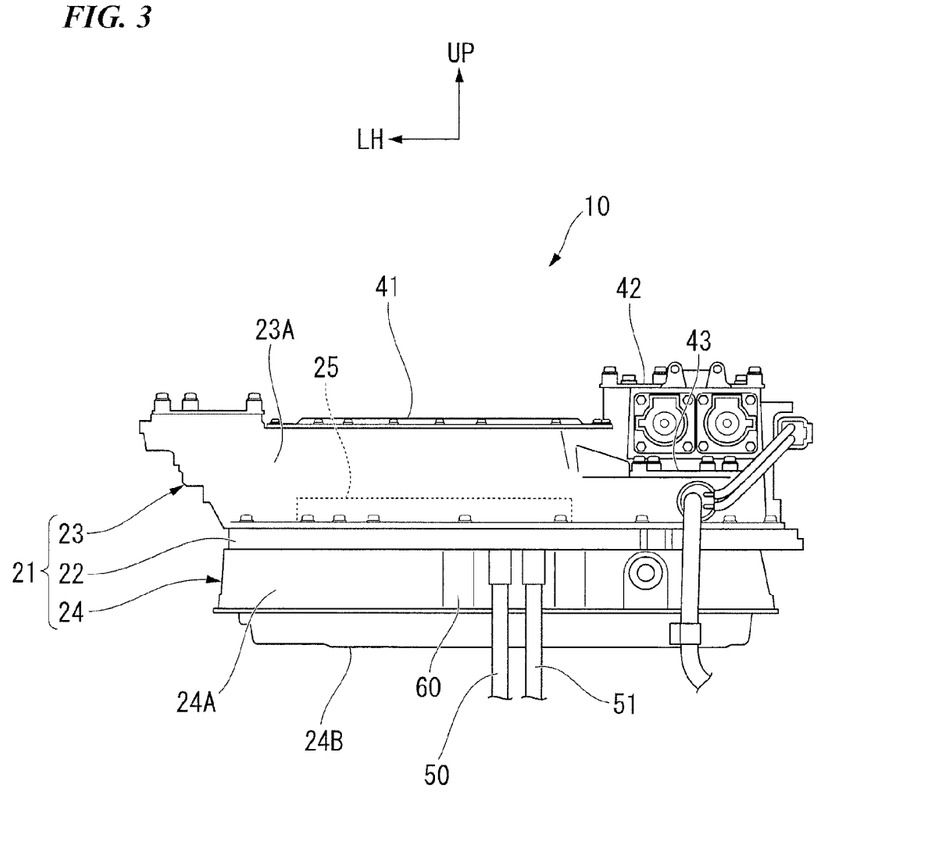
FIG. 3 is a rear view of the power control unit.
Figure 4:
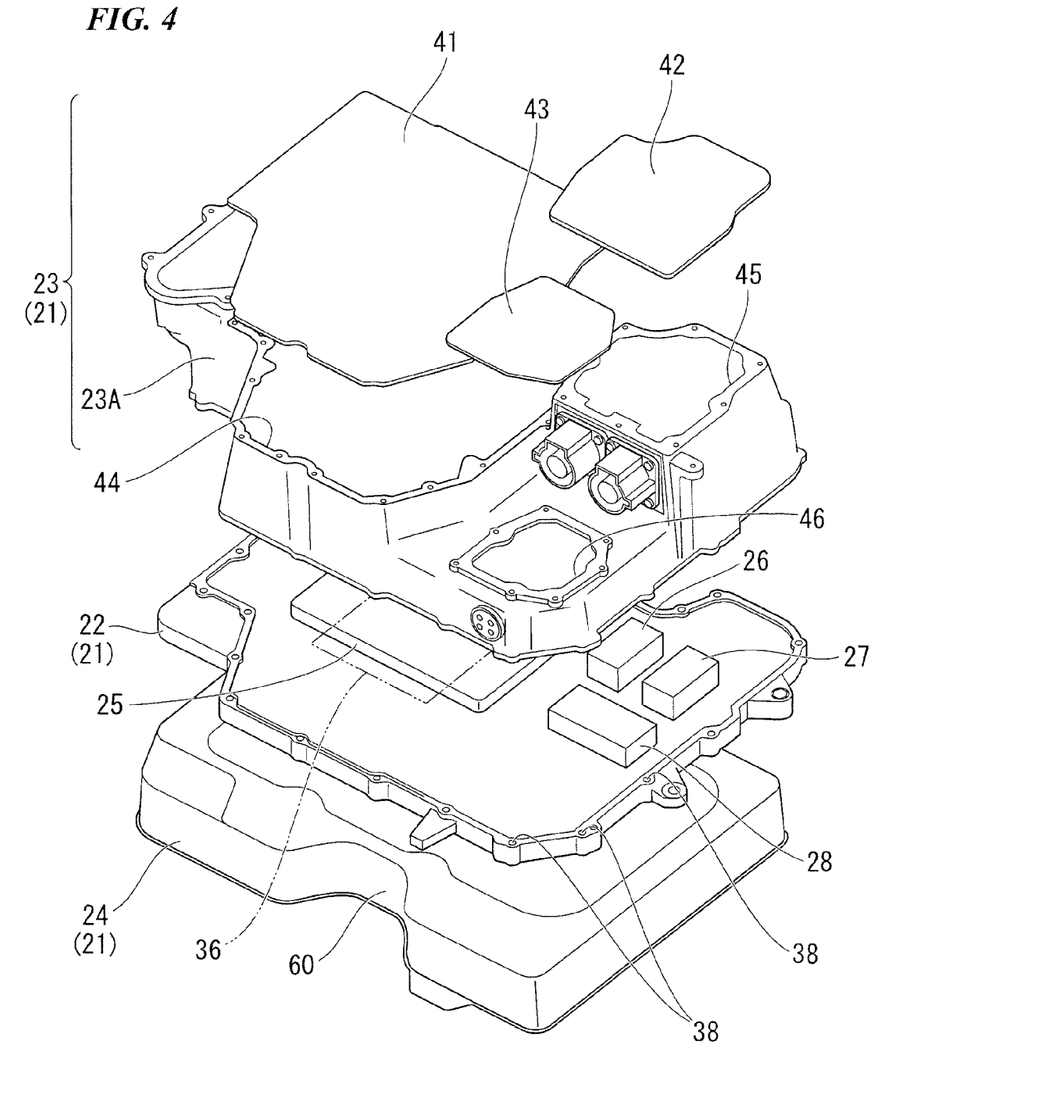
FIG. 4 is an exploded perspective view of the above power control unit as seen from the right rear side.

The following description will be performed with reference to FIGS. 2 to 4. The PCU 10 includes a housing 21 that stores a plurality of electric devices. For example, a plurality of electric devices, such as an inverter that converts the electric power from the battery into an alternating current from a direct current, and a control device that controls this inverter, are stored within the housing 21. The housing 21 includes an upper case 23 arranged at the upper side, and a lower case 24 arranged at the lower side, and is configured so that a plate-shaped heat sink housing 22 is attached between the upper case 23 and the lower case 24. The heat sink housing 22 is located at an intermediate position of the housing 21 in the up-and-down direction, and an outer peripheral portion thereof is exposed to the outside so as to constitute a portion of the outer wall of the housing 21.

The heat sink housing 22 is made of a material, such as an aluminum alloy, having high heat conductivity and is formed, for example, by molding, such as die-casting. As shown in FIG. 4, the outer peripheral portion of the heat sink housing 22 is formed with a plurality of bolt insertion holes 38 that penetrates in the up-and-down direction. The heat sink housing 22, the upper case 23, and the lower case 24 are integrated by bolts passed through the bolt insertion holes 38.

The plurality of electric devices is fixed to the top face of the heat sink housing 22. A switching module 25, which converts a direct current supplied from the battery (not shown) into a three-layer alternating current and supplies this three-layer alternating current to the motor, is installed at a substantially central region of the top face of the heat sink housing 22. A negative-side contactor 26 and a positive-side contactor 27 are installed side by side in the vehicle width direction on the right side of the switching module 25. The negative-side contactor 26 and the positive-side contactor 27 are electrically connected to a diode 28 installed on the back side thereof, and performs switching so as to turn on or off electrical connection so that an electric current does not flow to the above battery B suddenly when a comparatively high voltage is charged from a fast-charging power source.

Additionally, a heat sink portion 36 shown by two-dot chain lines for convenience of description is provided on the undersurface of the heat sink housing 22 that faces a region where the switching module 25 is installed. The switching module 25 is cooled by the heat sink portion 36. In addition, the heat sink portion 36 is constituted by, for example, a set of a plurality of fins or water jackets through which cooling water flows.

On the other hand, the lower case 24 is coupled to the undersurface of the heat sink housing 22 in a state where a step-down DC-DC converter (hereinafter, a down converter) and a charger that are not shown are stored. The down converter is a device that steps down the electric power from the battery B. Additionally, the charger is a device that enables the charging from a home power source, and is constituted to include an AC/DC converter or the like.

Figure 5:
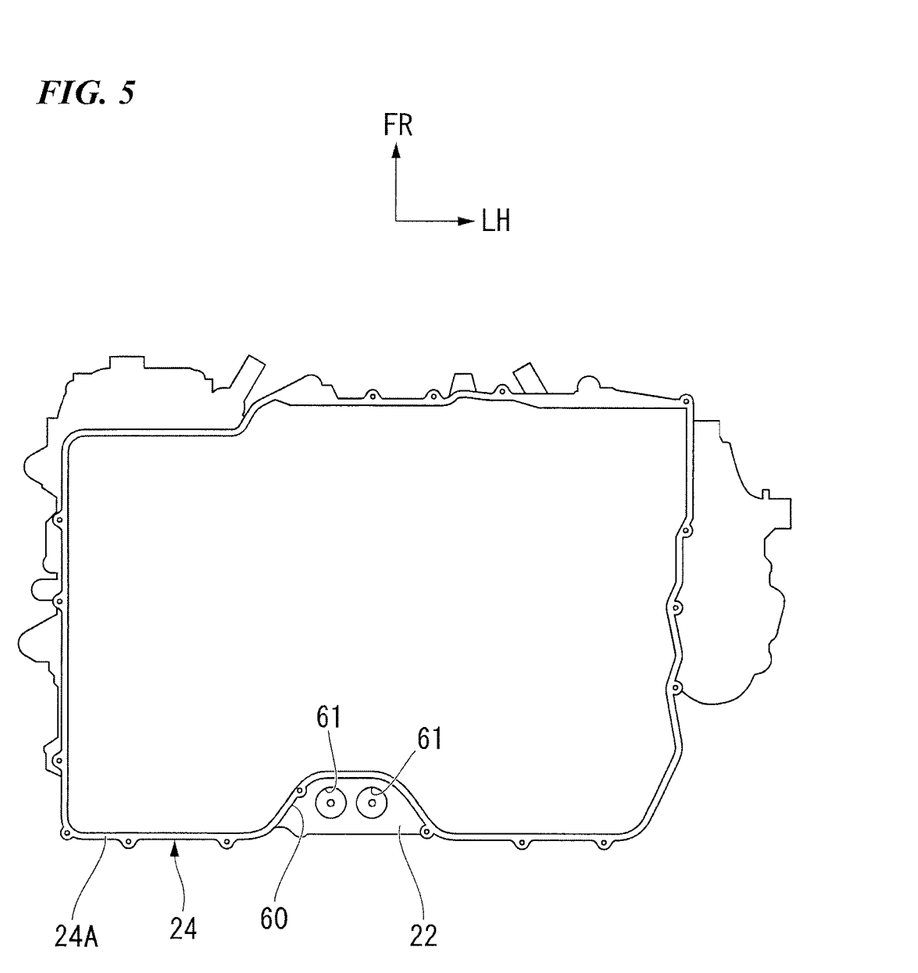
FIG. 5 is a bottom view of a lower case and a heat sink housing that are portions of a housing of the power control unit.

Referring to FIG. 3, the lower case 24 includes a lower case body 24A having a top plate portion, and a side wall portion that extends downward from an outer peripheral edge of the top plate portion, and a bottom cover member 24B that covers the side wall portion of the lower case 24A from below. FIG. 5 shows a state where the bottom cover member 24B is removed, and a space that stores the above-mentioned down converter and charger is formed on the inner side of the lower case body 24A.

Next, the following description will be performed with reference to FIGS. 2 to 4. The upper case 23 is configured so as to be coupled to the heat sink housing 22 to thereby form a storage space for the above-mentioned various electric devices installed on the top face of the heat sink housing 22, and covers the various above electric devices from above. The upper case 23 rises upward such that a lower outer peripheral edge thereof is joined to the outer peripheral portion of the heat sink housing 22, and includes an upper case body 23A that constitutes a side wall in the upper case 23, and first to third lids 41 to 43 that are attached to an upper portion of the upper case body 23A and constitutes a portion of an upper wall in the upper case 23.

In the present embodiment, the upper case body 23A is formed with first to third openings 44 to 46 for maintenance. The above-mentioned first to third lids 41 to 43 are detachably attached to each of the openings 44 to 46. It is possible to remove the lids 41 to 43 to thereby perform the maintenance of the internal electric devices.

The above-mentioned switching module 25 covered with the upper case 23 is electrically connected to the above-mentioned battery B. As shown in FIGS. 2 and 3, a positive-side high-voltage cable 50 and a negative-side high-voltage cable 51 for electrically connecting the switching module 25 and the battery B are connected to a rear portion of the PCU 10. As shown in FIG. 5, a recess 60 that is dented inward and exposes the undersurface of the heat sink housing 22 downward is formed at a substantially central location of a rear portion of the lower case 24 in the vehicle width direction. The positive-side high-voltage cable 50 and the negative-side high-voltage cable 51 are passed through the recess 60 from below.

Figure 6:
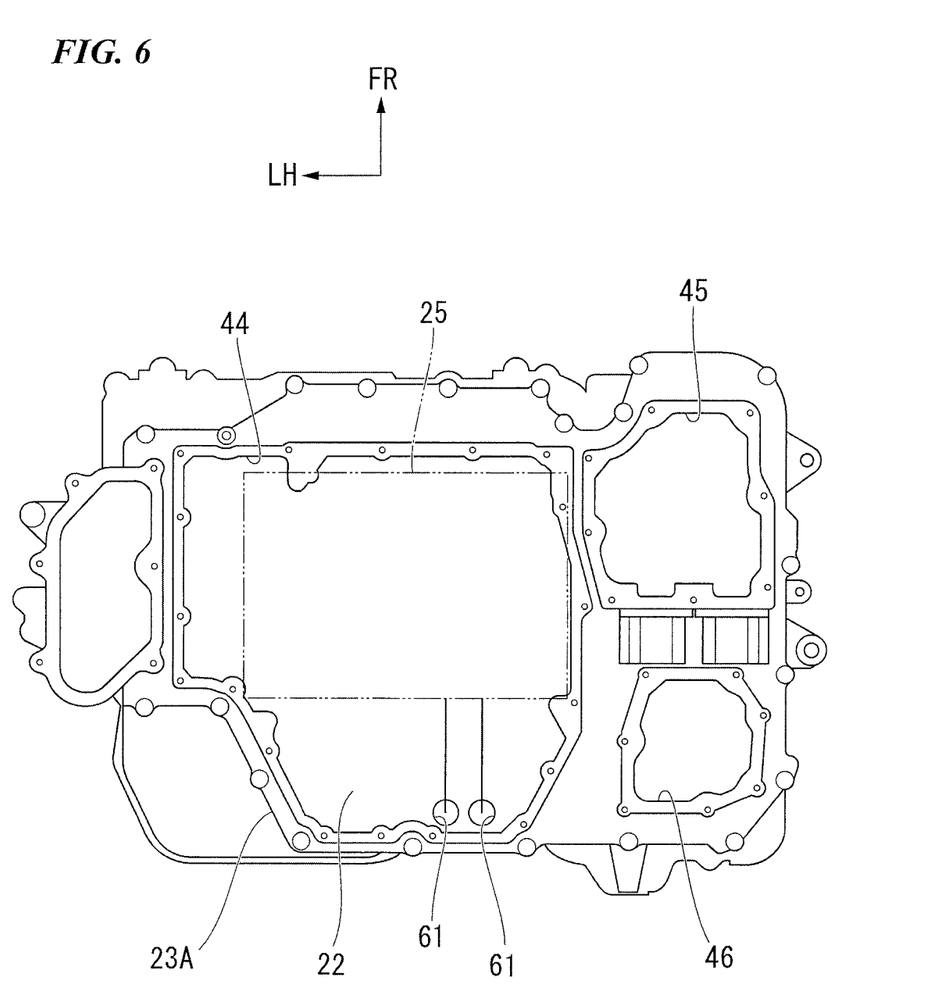
FIG. 6 is a top view of an upper case and the heat sink housing that are portions of the housing of the power control unit.

FIG. 6 is a top view of the upper case 23 and the heat sink housing 22. As shown in FIG. 6, pair of through holes 61 and 61 is formed at the location of the heat sink housing 22 that is located above the recess 60. The positive-side high-voltage cable 50 and the negative-side high-voltage cable 51 enter the inside of the upper case 23 from the through holes 61 and 61, and are connected to the switching module 25.

Figure 7:
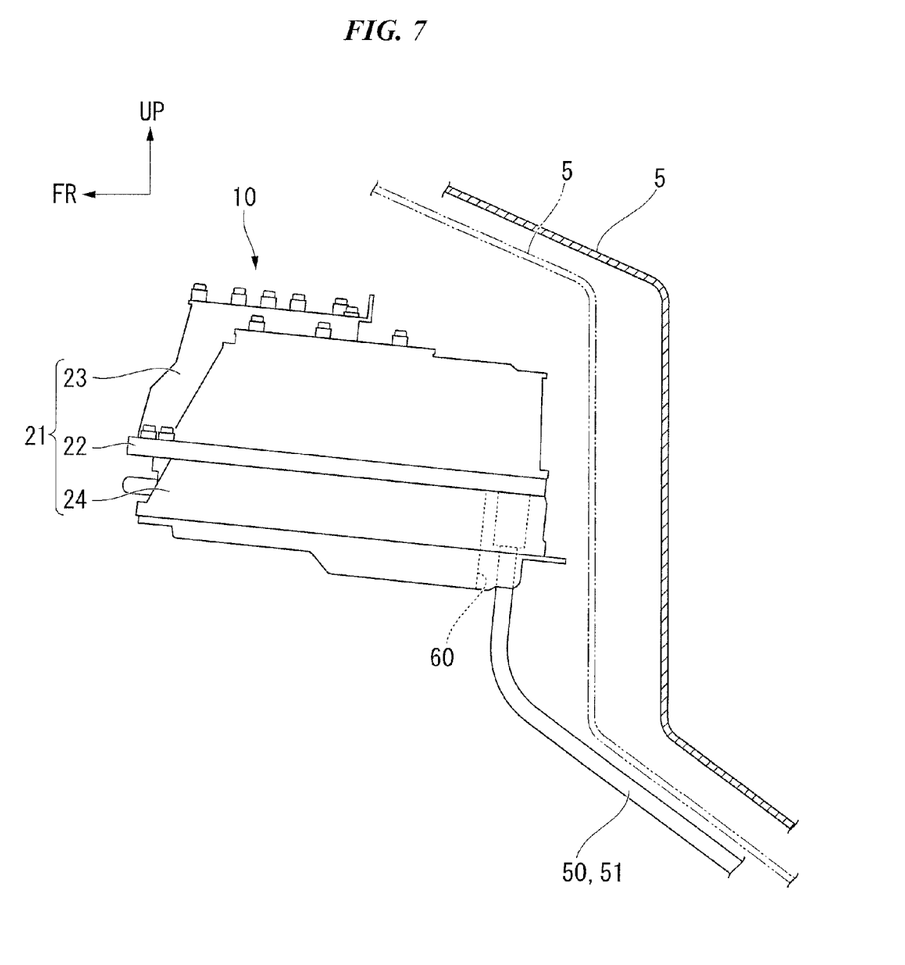
FIG. 7 is a schematic side view of the power control unit and a dash panel.

The following description will be performed with reference to FIG. 7. In the present embodiment, the dash panel 5 extends obliquely forward and upward from the rear of the vehicle, and extends upward from the rear lower position of the PCU 10 to partition the motor room 6. The positive-side high-voltage cable 50 and the negative-side high-voltage cable 51 are wired along the shape of the dash panel 5 from the battery B under the floor, and enter the inside of the upper case 23 as described above. Additionally, in the present embodiment, a power line that is not shown is further connected to the switching module 25 in addition to the above-mentioned positive-side high-voltage cable 50 and the negative-side high-voltage cable 51. Electric power is distributed to the above-mentioned down converter arranged inside of the lower case 24 from this power line. This power line is passed through a through hole (not shown) provided at the heat sink housing 22, and is connected to the above down converter.

As described above, in the electric vehicle 1 of the present embodiment, the housing 21 of the PCU 10 includes the upper case 23 that is arranged at the upper side, the lower case 24 that is arranged at the lower side, and the heat sink housing 22 that is fixed between the upper case 23 and the lower case 24 and constitutes a portion of the outer wall of the housing at a substantially intermediate position in the up-and-down direction, and the heat sink housing 22 includes the heat sink portion 36 for cooling the electric devices. The electric devices (the switching module 25 on the upper side and the down converter and the charger on the lower side) are arranged at the upper and lower sides of the heat sink housing 22, and the electricity devices are covered with the upper case 23 and the lower case 24.

Also, the lower case 24 is formed with the recess 60 that is dented inward and exposes the undersurface of the heat sink housing 22 downward, the positive-side high-voltage cable 50 and the negative-side high-voltage cable 51, which connect the battery B, and the electric devices (switching module 25) covered with the upper case 23, enter the inside of the upper case 23 through the recess 60 from the undersurface of the heat sink housing 22, and the positive-side high-voltage cable 50 and the negative-side high-voltage cable 51 are connected to the switching module 25 covered with the upper case 23.

In such an electric vehicle 1, as shown in FIG. 7, in a case where the PCU 10 has moved due to collision or the like (two-dot chain lines in the drawing show an appearance in which the PCU 10 has approached the dash panel 5), a rear end portion of the heat sink housing 22 or the lower case 24 is brought into contact with the dash panel 5 before the positive-side high-voltage cable 50 and the negative-side high-voltage cable 51 come into contact with the dash panel 5. Thereby, the positive-side high-voltage cable 50 and the negative-side high-voltage cable 51 can be kept from interfering with the dash panel 5, and can be effectively protected.

Additionally, in the present embodiment, the battery B is arranged under the floor of the vehicle, the motor room 6 is formed at the vehicle front part, the recess 60 is formed on the rear side in the vehicle front-and-rear direction, the positive-side high-voltage cable 50 and the negative-side high-voltage cable 51 extend from the battery B, are wired along the shape of the dash panel 5 that is arranged behind the motor room 6 to partition the vehicle interior and the motor room 6, and enter the inside of the upper case 23. In such a configuration, the positive-side high-voltage cable 50 and the negative-side high-voltage cable 51 from the battery B to the PCU 10 can be shortened.

Additionally, in the present embodiment, the switching module 25 is supplied with electric power through the positive-side high-voltage cable 50 and the negative-side high-voltage cable 51, and the electric power branches from the switching module 25 so as to be distributed to the down converter covered with the lower case 24. In such a configuration, the number of cables related to power supply can be suppressed.

Although the embodiment of the invention has been described above, the invention is not limited to the above embodiment, and can be appropriately changed without departing from the scope thereof.

REFERENCE SIGNS LIST

1: ELECTRIC VEHICLE
5: DASH PANEL
6: MOTOR ROOM
10: POWER CONTROL UNIT (PCU)
21: HOUSING
22: HEAT SINK HOUSING
23: UPPER CASE
24: LOWER CASE
36: HEAT SINK PORTION
50: POSITIVE-SIDE HIGH-VOLTAGE CABLE (CABLE)
51: NEGATIVE-SIDE HIGH-VOLTAGE CABLE (CABLE)
60: RECESS
B: BATTERY

The invention claimed is:
1. An electric vehicle comprising:
a plurality of electric devices; and
a power control unit having a housing that stores the electricity devices,
wherein,
the power control unit is arranged within a motor room,
the housing comprises an upper case that is arranged at a relatively upper side, a lower case that is arranged at a relatively lower side, and a heat sink housing that is fixed between the upper case and the lower case and consti- tutes a portion of an outer wall of the housing at a substantially intermediate position of the housing in an up-and-down direction, the heat sink housing has a heat sink portion for cooling the electric devices, the electric devices are each arranged at the upper and lower sides of the heat sink housing, each of the electric devices are covered with the upper case and the lower case, the lower case is formed with a recess that is dented toward inner side of the housing and exposes undersurface of the heat sink housing downward, and cables that connect an electric device arranged outside the housing and the electric device covered with the upper case enter inside of the upper case through the recess from the undersurface of the heat sink housing, and the cables are connected to the electric device covered with the upper case.

2. The electric vehicle according to claim 1, wherein, a battery is arranged under a floor of a vehicle body, the motor room is formed at a front part of the vehicle body, the recess is formed on a rear side in a front-and-rear direction of the vehicle body, and the cables extend from the battery, are wired along a shape of a dash panel that is arranged behind the motor room to partition a vehicle interior and the motor room, and enter inside of the upper case.

3. The electric vehicle according to claim 2, wherein, the electric device covered with the upper case are supplied with electric power through the cables, and the electric power branches from the electric device so as to be distributed to the electric device covered with the lower case.

* * * * *